United States Patent
Lin et al.

(10) Patent No.: US 10,657,303 B2
(45) Date of Patent: May 19, 2020

(54) CIRCUIT ENCODING METHOD AND CIRCUIT STRUCTURE RECOGNITION METHOD

(71) Applicant: REALTEK SEMICONDUCTOR CORP., Hsinchu (TW)

(72) Inventors: Yun-Jing Lin, Yilan County (TW); Meng-Jung Lee, Taoyuan (TW); Yu-Lan Lo, Hsinchu County (TW); Shu-Yi Kao, Hsinchu County (TW); Chien-Nan Liu, Hsinchu County (TW); Yu-Kang Lou, Taichung (TW); Ching-Ho Lin, Tainan (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 47 days.

(21) Appl. No.: 15/928,535

(22) Filed: Mar. 22, 2018

(65) Prior Publication Data

US 2018/0307782 A1  Oct. 25, 2018

(30) Foreign Application Priority Data

Apr. 21, 2017 (TW) .............................. 106113448 A

(51) Int. Cl.
*G06F 30/327* (2020.01)
*G06F 30/36* (2020.01)
(Continued)

(52) U.S. Cl.
CPC ........ *G06F 30/327* (2020.01); *G06F 30/3323* (2020.01); *G06F 30/36* (2020.01); *G06F 2111/20* (2020.01)

(58) Field of Classification Search
CPC .. G06F 17/505; G06F 17/504; G06F 17/5063; G06F 2217/02; G06F 30/327;
(Continued)

(56) References Cited

U.S. PATENT DOCUMENTS

| 6,536,018 B1 * | 3/2003 | Chisholm ........... G06F 17/5045 |
| | | 716/136 |
| 7,246,334 B1 * | 7/2007 | Dastidar ............. G06F 17/5022 |
| | | 716/106 |

(Continued)

OTHER PUBLICATIONS

Taiwan Intellectual Property Office, "Office Action", dated Apr. 30, 2018. OA letter of the counterpart TW application. Summary of the OA letter: Reference 1 renders claim 1 obvious.
(Continued)

*Primary Examiner* — Nha T Nguyen
(74) *Attorney, Agent, or Firm* — WPAT, PC

(57) ABSTRACT

This invention discloses a circuit encoding method and a circuit structure recognition method. The circuit encoding method is applied to a circuit structure recognition process of a circuit. The circuit is coupled to a voltage source and a reference voltage. The circuit encoding method includes: selecting a target transistor from the circuit; when a terminal of the target transistor is electrically connected to the voltage source or the reference voltage, adding a first value to a terminal value of the terminal; when the terminal of the target transistor is electrically connected to a terminal other than the voltage source and the reference voltage, adding a second value to the terminal value of the terminal; and taking a set of multiple terminal values of the target transistor as a transistor signature of the target transistor.

11 Claims, 8 Drawing Sheets

(51) Int. Cl.
*G06F 30/3323* (2020.01)
*G06F 111/20* (2020.01)

(58) Field of Classification Search
CPC ... G06F 30/3323; G06F 30/36; G06F 2111/20
See application file for complete search history.

(56) References Cited

U.S. PATENT DOCUMENTS

| | | | | |
|---|---|---|---|---|
| 7,739,646 B2* | 6/2010 | Lin | | G06F 17/5077 |
| | | | | 716/119 |
| 7,937,678 B2* | 5/2011 | Lippmann | | G06F 17/505 |
| | | | | 716/103 |
| 7,958,468 B2* | 6/2011 | Meserve | | G06F 17/5045 |
| | | | | 716/100 |
| 8,434,037 B2* | 4/2013 | Krishnan | | G06F 17/5045 |
| | | | | 703/20 |
| 8,788,990 B2* | 7/2014 | Meserve | | G06F 17/505 |
| | | | | 716/100 |
| 9,256,706 B2* | 2/2016 | Chen | | G06F 17/5077 |
| 9,367,659 B2* | 6/2016 | Saghizadeh | | G06F 17/5045 |
| 9,830,414 B2* | 11/2017 | Saghizadeh | | G06F 17/5045 |
| 2007/0256037 A1* | 11/2007 | Zavadsky | | G06F 17/5045 |
| | | | | 716/103 |
| 2008/0282212 A1* | 11/2008 | Dennison | | G06F 17/5045 |
| | | | | 716/122 |
| 2010/0042964 A1* | 2/2010 | Meserve | | G06F 17/505 |
| | | | | 716/126 |

OTHER PUBLICATIONS

Georges G. E Gielen, Senior Member, IEEE, and Rob A. Rutenbar, Fellow, IEEE "Computer-Aided Design of Analog and Mixed-Signal Integrated Circuits" Proceedings of the IEEE vol. 88, No. 12. Dec. 2000.

* cited by examiner

| | D | G | S | B | P | N |
|---|---|---|---|---|---|---|
| M1 | 2 | 4 | 11 | 9 | 1 | 0 |
| M2 | 2 | 4 | 9 | 7 | 0 | 1 |
| transistor group | 4 | 8 | 20 | 16 | 1 | 1 |

| | D | G | S | B |
|---|---|---|---|---|
| M1 | 2 | 4 | 11 | 9 |
| M2 | 2 | 4 | 9 | 7 |
| transistor group | 4 | 8 | 20 | 16 |

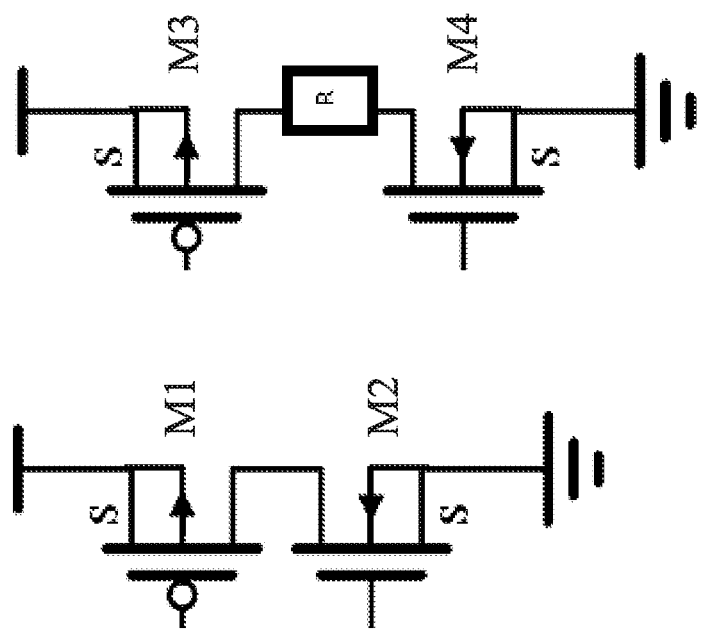

CIRCUIT ENCODING METHOD AND CIRCUIT STRUCTURE RECOGNITION METHOD

BACKGROUND OF THE INVENTION

1. Field of the Invention

The present invention generally relates to circuit design, and, more particularly, to a circuit encoding and recognition method.

2. Description of Related Art

Today's circuit designs are mostly done with the aid of electronic design automation (EDA) and computer-aided design (CAD). When it is required to recognize the structure of a circuit from a component connection description file (such as a netlist generated by a Simulation Program with Integrated Circuit Emphasis (SPICE)) of that circuit, usually the structure hierarchy tree of that circuit is firstly established according to the component connection description file, and then the circuit sub blocks corresponding to the branches of the structure hierarchy tree are recognized in a recursive manner before comparison operations are performed on these circuit sub blocks. The disadvantage of this method is that both establishing the structure hierarchy tree and recognizing the circuit sub blocks in the recursive manner take considerable time.

SUMMARY OF THE INVENTION

In view of the issues of the prior art, an object of the present invention is to provide a circuit encoding method and a circuit structure recognition method, so as to make an improvement to the prior art.

A circuit structure recognition method is disclosed. The method is applied to a component connection description file that corresponds to a circuit and records multiple connections of multiple transistors in the circuit. The method includes steps of: generating a transistor signature for each transistor, the transistor signature being associated with the connections of each transistor; dividing the circuit into multiple transistor groups according to multiple electrical connections of the drains or sources of the transistors, or according to sub block declaration in the component connection description file; generating a group signature for each transistor group according to the transistor signatures of the transistors in each transistor group; comparing the group signatures with a predetermined group signature; and when a target group signature of the group signatures is the same as the predetermined group signature, recognizing a target transistor group corresponding to the target group signature as a predetermined circuit sub block cell corresponding to the predetermined group signature.

A circuit encoding method is disclosed. The method is applied to a circuit structure recognition process of a circuit coupled to a voltage source and a reference voltage. The method includes steps of: selecting a target transistor from the circuit; adding a first value to a terminal value of a terminal of the target transistor when the terminal is electrically connected to one of the voltage source and the reference voltage; adding a second value to the terminal value of the terminal of the target transistor when the terminal is electrically connected to a terminal other than the voltage source and the reference voltage; and taking a set of multiple terminal values of the target transistor as a transistor signature of the target transistor.

According to the circuit structure recognition method of the present invention, the circuit is divided into a plurality of circuit sub blocks according to the electrical connections of the drains or sources in the circuit, so that a preliminary division and determination of the circuit can be quickly conducted. The circuit encoding method provides a simple encoding algorithm that can quickly encode the circuit and help to improve the efficiency and accuracy of the comparison operations of the circuit sub blocks in the circuit structure recognition method. As opposed to the prior art's recursive method of finding the circuit sub blocks, the present invention greatly shortens the time of recognizing the circuit structure.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 8 illustrates a schematic diagram of "electrical connection."

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a circuit encoding method and a circuit structure recognition method that improve the speed and accuracy of the circuit structure recognition. People of ordinary skill in the art can choose components or steps equivalent to those described in this specification to carry out the present invention, which means that the scope of this invention is not limited to the embodiments in the specification.

Figure 1:
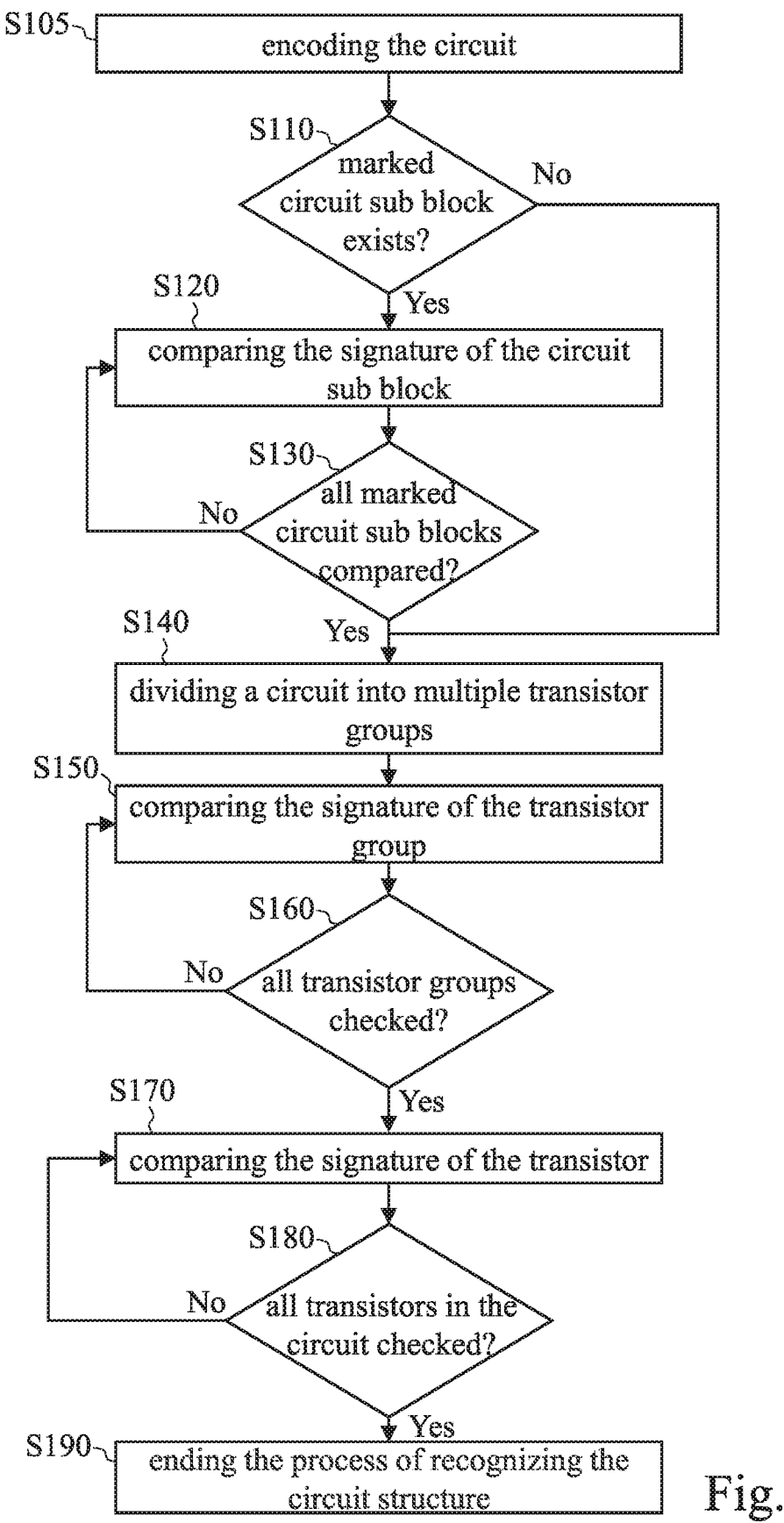
FIG. 1 illustrates a flowchart of a circuit structure recognition method according to an embodiment of the present application.

FIG. 1 is a flowchart of a circuit structure recognition method according to an embodiment of the present application. The circuit structure recognition method of this invention is applied to a component connection description file of a circuit. The component connection description file describes the connections of multiple transistors in the circuit. The circuit structure recognition method first encodes the circuit (step S105). More specifically, this step encodes the circuit according to the connections of multiple transistors in the circuit, and after the encoding, a transistor signature is obtained for each transistor. In one embodiment, the encoding process generates a terminal value for each of the terminals (including the gate, the source, the drain, and the bulk) of a transistor, and the transistor signature of the transistor is the set of the multiple terminal values of that transistor. The terminal value for each terminal depends on the type(s) of one or more terminals to which each terminal is connected. In one embodiment, when the terminal is connected to an external terminal, step S105 assigns an external value to that terminal; when the terminal is connected to an internal terminal, step S105 assigns an internal value to that terminal. An external terminal is, for example, a voltage source or ground of a circuit, whereas the internal terminal is, for example, another terminal of that transistor itself or a terminal of other transistors in the circuit. Table 1 shows the correspondence between the types of the terminals and the values according to an exemplary embodiment. In this embodiment, the value corresponding to the external terminal is an odd number and the value corresponding to the internal terminal is an even number. Table 1 is for the purpose of illustration only and is not intended to limit the present invention.

TABLE 1

| External or internal terminal | terminal type | value |
| --- | --- | --- |
| external | ground | 1 |
|  | voltage source | 3 |
| internal | Drain | 2 |
|  | Gate | 4 |
|  | Source | 6 |
|  | Bulk | 8 |

Figure 2:
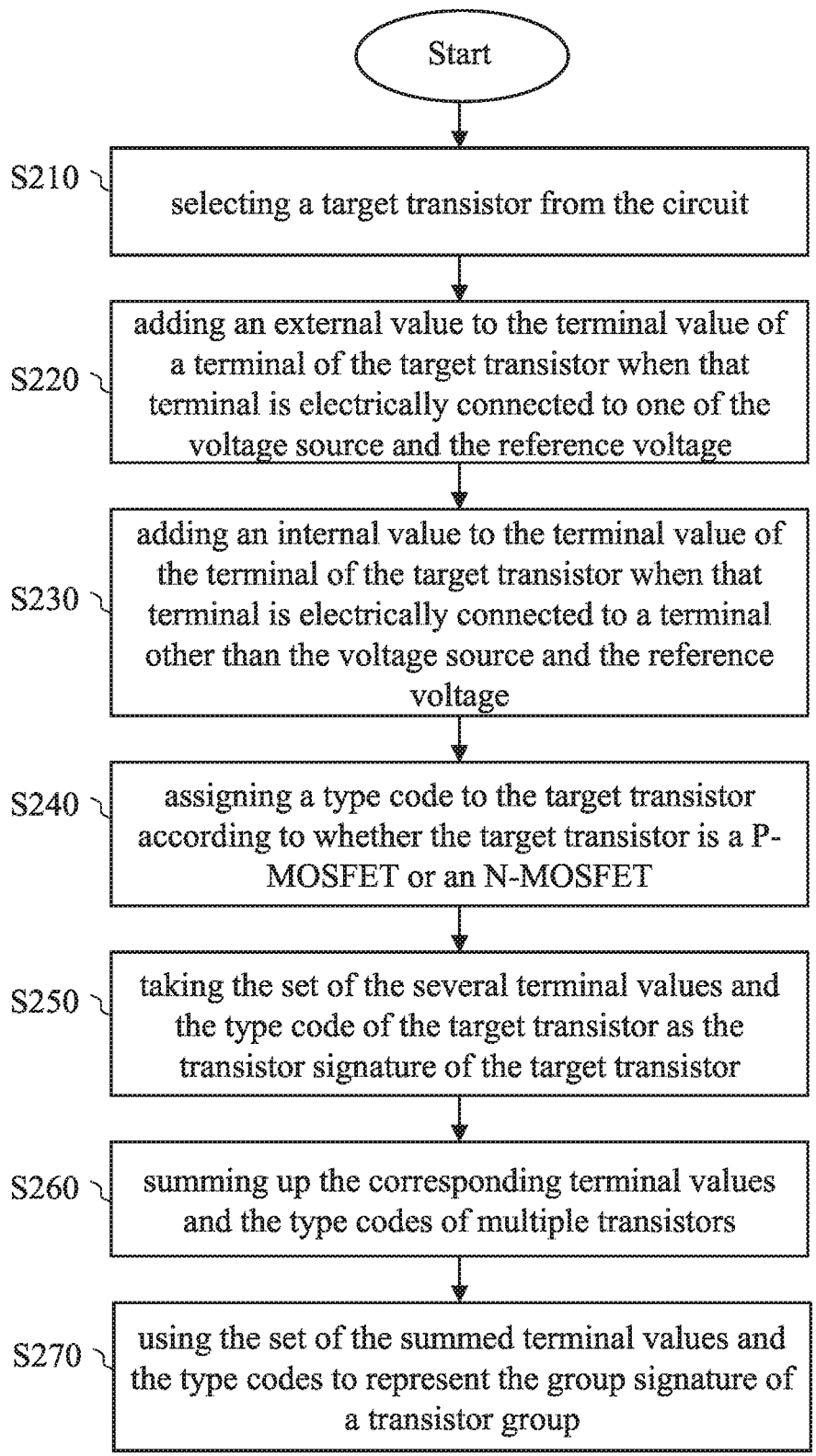
FIG. 2 illustrates the detailed steps of the encoding process.
Figures 3A, 3B, 3C:
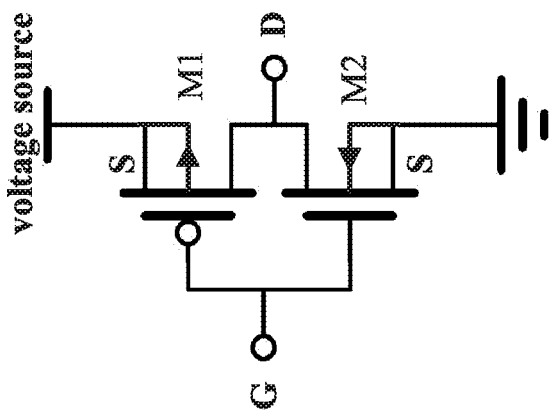
FIGS. 3A-3C illustrate an example of encoding according to the present invention.

FIG. 2 shows the detailed steps of the encoding process. The flow of FIG. 2 is discussed below with the reference to the encoding examples of FIGS. 3A-3C. FIG. 3A is an inverter, which includes two serially connected transistors M1 and M2. First, a target transistor is selected from the circuit (step S210), for example, selecting M1. Next, in steps S220 and S230, based on the type(s) of the terminal(s) to which each terminal of the target transistor is electrically connected, corresponding value(s) is/are added to the terminal value (with a preset value being zero) of each terminal. More specifically, when a terminal of the target transistor is electrically connected to a voltage source or a reference voltage (i.e., an external terminal), an external value (e.g., a value of one or three in Table 1) is added to the terminal value of that terminal (step S220); when a terminal of the target transistor is electrically connected to a terminal other than the voltage source and ground, that is, when the terminal of the target transistor is electrically connected to an internal terminal, an internal value (e.g., a value of two, four, six or eight in Table 1) is added to the terminal value of that terminal (step S230). Steps S220 and S230 can be swapped. For example, for M1, its drain (D) is electrically connected to the drain of M2 only, and so the terminal value of the drain after encoding is two (step S230); its gate (G) is electrically connected to the gate of M2 only, and so the terminal value of the gate after encoding is four (step S230); its source (S) is electrically connected to the voltage source and the bulk, and so the terminal value of the source after encoding is eleven (=3+8) (steps S220 and S230); its bulk (B) is electrically connected to its source and the voltage source, and so the terminal value of the bulk after encoding is nine (=3+6) (steps S220 and S230).

Next, a type code is assigned to the target transistor according to whether the target transistor is a P-type metal-oxide semiconductor field-effect transistor (P-MOSFET) or an N-type metal-oxide semiconductor field-effect transistor (N-MOSFET) (step S240). For example, the type code may be represented by (P, N), with P being one for P-MOSFET and N being one for N-MOSFET; thus, the type code (P, N) for M1 is (1, 0) and the type code (P, N) for M2 is (0, 1). The set of the several terminal values and the type code of the target transistor is the transistor signature of the target transistor (step S250). As shown in FIG. 3B, one set contains six elements—D, G, S, B, P and N; the transistor signature {D, G, S, B, P, N} for M1 is {2, 4, 11, 9, 1, 0} and that for M2 is {2, 4, 9, 7, 0, 1}. As the transistor group in FIG. 3A consists of M1 and M2, after the corresponding terminal values and the type codes of the constituent transistors are summed up (step S260), the set of the summed terminal values and the type codes can be employed to represent the group signature of that transistor group (step S270). As shown in FIG. 3B, the group signature {D, G, S, B, P, N}={4, 8, 20, 16, 1, 1} is the sum of the corresponding elements of the transistor signatures of the transistors M1 and M2.

In another embodiment, the transistor signature and the group signature are a set of terminal values only, not containing the type code; that is, the type code is not taken into consideration in steps S240 to S270. The transistor signatures and the group signature of this embodiment are shown in FIG. 3C.

The aforementioned term "electrical connection" or "electrically connect" means that two terminals are electrically connected either in a direct manner, or with one or more passive components (such as resistors, inductors or capacitors) existing therebetween. For instance, as shown in FIG. 8, the drains of the transistors M1 and M2 are electrically connected to each other, while the drains of the transistors M3 and M4 are connected through the resistor R. In the embodiments of the present invention, the drains of the transistors M3 and M4 are still considered "electrically connected." Note that any two of the source, the drain and the gate of a same transistor are not considered "electrically connected."

The discussion of FIG. 1 continues below by referring to the embodiment in FIG. 3B. After step S105 is completed (i.e., the transistor signatures of all the transistors in the circuit have been obtained), whether there is a circuit sub block marked in the component connection description file is determined (step S110). As the structures of some circuit sub blocks frequently appear in the circuits, usually the circuit designers directly employ ready-made models corresponding to the structures of the circuit sub blocks to save time in the circuit design. The ready-made models are marked as circuit sub blocks in the component connection description file; thus, this step is to determine whether there is any circuit sub block marked in the component connection description file. The determination process, for example, may search in the component connection description file for a specific tag that represents the circuit sub block. For example, in the case of the netlist, the structure of the circuit sub block may be independently declared "subckt." When a marked circuit sub block is found, the signature of the circuit sub block is compared with the data in the circuit sub block cell library (step S120). Like the above-mentioned group signature, the signature of a circuit sub block is the set of summed corresponding elements of the transistor signatures of the multiple transistors that the circuit sub block contains. The cell library stores multiple predetermined circuit sub block cells and their signatures. The predetermined circuit sub block cells are, for example, logic gates (e.g., an AND gate, an OR gate, an inverter, etc.) and/or circuits having specific functions (e.g., a phase locked loop, an analog-to-digital converter, a digital-to-analog converter, etc.). Similarly, the signature of a predetermined circuit sub block cell is the set of summed corresponding elements of the transistor signatures of the multiple transistors that the predetermined circuit sub block cell contains.

Figure 4:
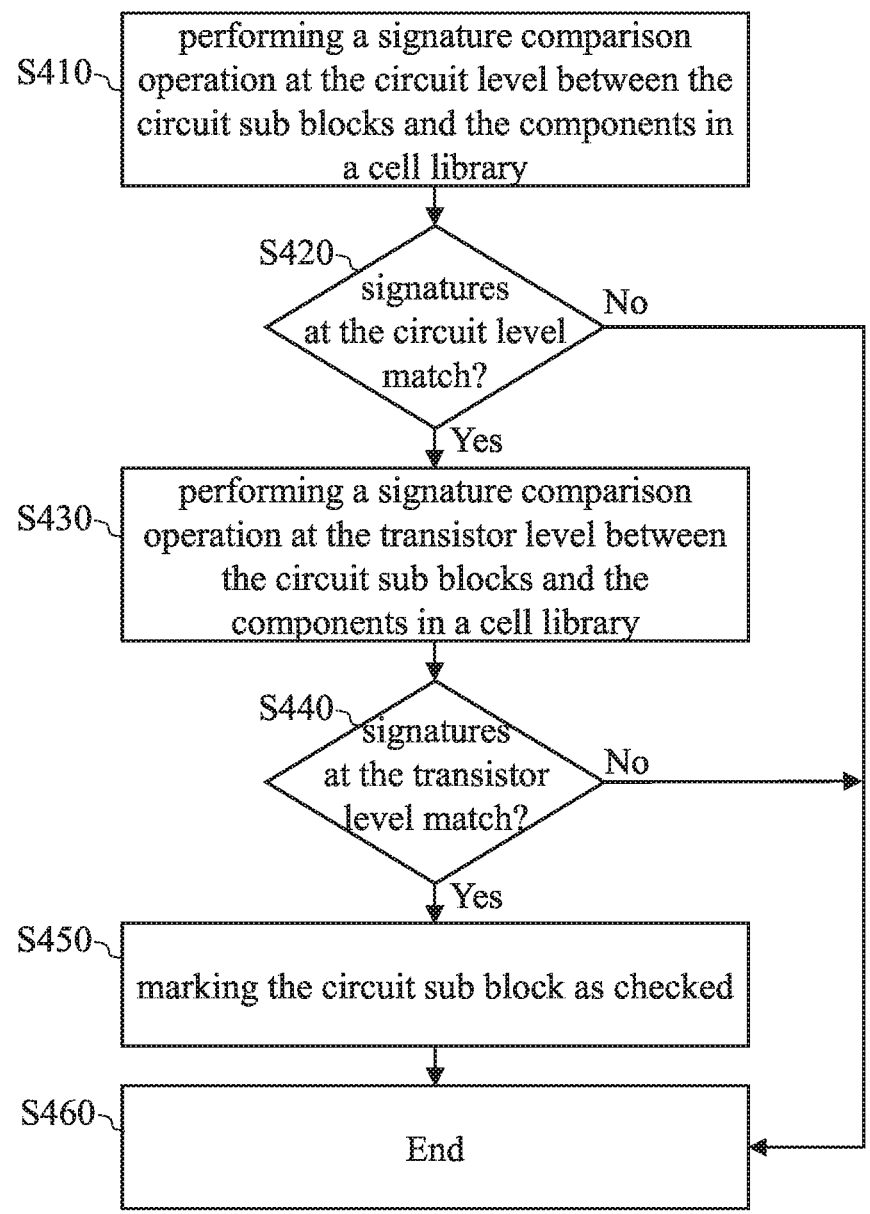
FIG. 4 illustrates a detailed flow of step S120 in FIG. 1.

FIG. 4 is a detailed flow of step S120 in FIG. 1. Firstly, a signature comparison operation at the circuit level is conducted between the circuit sub blocks and the circuit sub block cells in the circuit sub block cell library (step S410). More specifically, in this step, the signatures of the circuit sub blocks are compared with the signatures of the predetermined circuit sub block cells. If no predetermined circuit sub block cell whose signature is the same as the signatures of the circuit sub blocks can be found in the circuit sub block cell library (i.e., the determination result of step S420 is negative), step S120 ends (step S460); if the determination result of step S420 is positive, a signature comparison operation at the transistor level is then conducted between the circuit sub blocks and the predetermined circuit sub block cells in the circuit sub block cell library (step S430). More specifically, step S430 determines whether the number of transistors in the circuit sub block is equal to the number of transistors in the predetermined circuit sub block cell, and whether the transistor signatures of all transistors in the circuit sub block are the same as the transistor signatures of all transistors in the predetermined circuit sub block cell. For example, suppose that the signatures of the predetermined circuit sub block cell are shown as Table 2, although the group signature shown in Table 2 is the same as that of FIG. 3B (i.e., the signatures match at the circuit level), the transistor signature of at least one of the transistors M1' and M2' is different from the transistor signatures of the transistors M1 and M2. As a result, the determination result of step S440 is negative. If, on the other hand, the signatures of the predetermined circuit sub block cell are shown as Table 3, then the determination result of step S440 is positive because the transistor signature of M1" is the same as that of M1 and the transistor signature of M2" is the same as that of M2. When the determination result of step S440 is negative, step S120 ends (step S460). When the determination result of step S440 is positive, the circuit sub block is marked as checked (step S450); that is, it is confirmed that the circuit sub block has been recognized as a predetermined circuit sub block cell.

TABLE 2

|  | D | G | S | B | P | N |
|---|---|---|---|---|---|---|
| M1' | 2 | 4 | 9 | 7 | 1 | 0 |
| M2' | 2 | 4 | 11 | 9 | 0 | 1 |
| transistor group | 4 | 8 | 20 | 16 | 1 | 1 |

TABLE 3

|  | D | G | S | B | P | N |
|---|---|---|---|---|---|---|
| M1" | 2 | 4 | 11 | 9 | 1 | 0 |
| M2" | 2 | 4 | 9 | 7 | 0 | 1 |
| transistor group | 4 | 8 | 20 | 16 | 1 | 1 |

Reference is made back to FIG. 1. After step S120 ends, the flow proceeds to step S130 to determine whether all the circuit sub blocks marked in the component connection description file have been compared. When the determination result of step S130 is negative, the flow goes back to step S120 to compare other marked circuit sub blocks; when the determination result of step S130 is positive, the flow proceeds to step S140.

Figure 5:
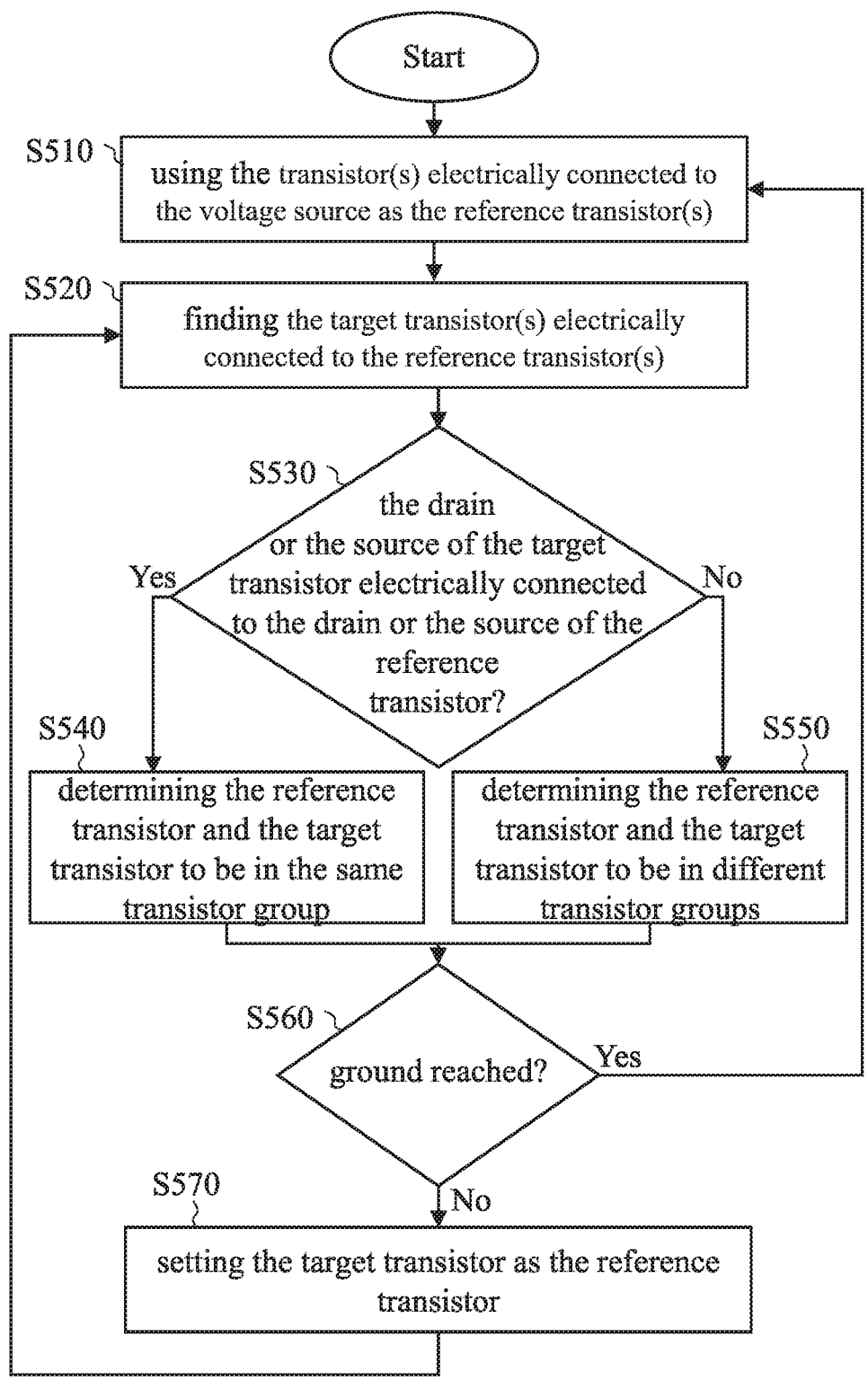
FIG. 5 illustrates the detailed steps of the division operation of the present invention.
Figure 6:
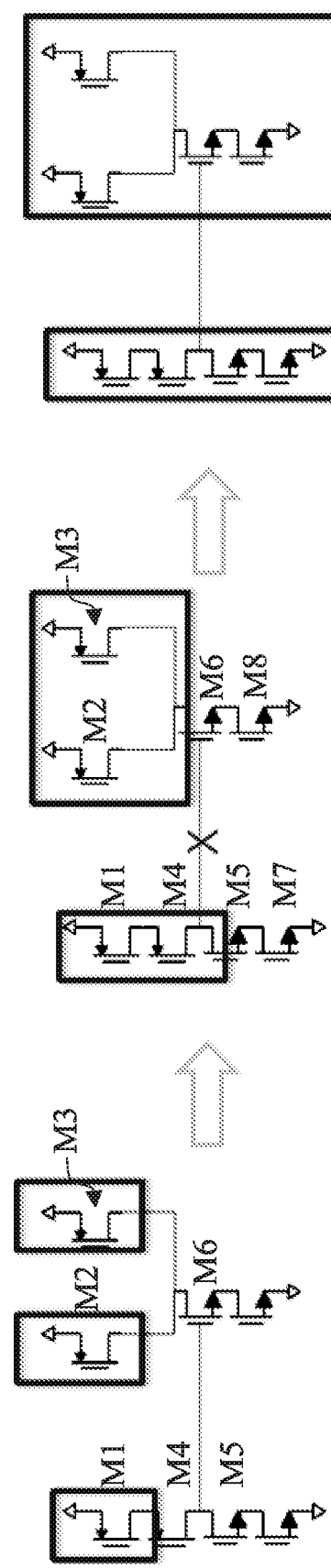
FIG. 6 illustrates an example of the division operation of the present invention.

In step S140, the parts not marked as the circuit sub block in the component connection description file are processed in order that the circuits of those parts are divided into multiple circuit sub blocks; that is, the transistors in the circuits of those parts are grouped to form multiple transistor groups. The division operation is based on the electrical connections of the drains or sources of the transistors to divide the circuit into multiple transistor groups. FIG. 5 shows the detailed steps of this division operation, and FIG. 6 shows an example of this division operation. The division operation starts from the voltage source or ground of the circuit (this embodiment uses the voltage source as an example) to find the transistor(s) electrically connected to the voltage source and use the found transistor(s) as the reference transistor(s) (step S510). As shown in the left drawing of FIG. 6, the transistors M1, M2 and M3 are found in step S510. Next, the target transistor(s) electrically connected to the reference transistor(s) (currently, the transistors M1, M2 and M3) are found (step S520); that is, the transistors M4, M2 and M3 (the transistors M2 and M3 are each other's target transistor) are found in step S520. Next, it is determined whether the drain or source of the target transistor is electrically connected to the drain or source of the reference transistor (step S530). Because the determination result of step S530 is positive for the transistors M1 and M4 as well as for the transistors M2 and M3, the reference transistor and the target transistor are thus determined to be in the same transistor group (step S540); specifically, the transistors M1 and M4 are in a transistor group, and the transistors M2 and M3 are in another transistor group. Then, whether ground is reached is determined in step S560. Because none of the transistors M2, M3 and M4 is electrically connected to ground, the determination result of step S560 is negative. Next, the target transistor is set as the reference transistor in step S570; that is, the transistors M2, M3 and M4 are set as the reference transistors, and then the flow goes back to step S520.

For M4, the target transistors found in step S520 this time are the transistors M5 and M6. For the transistors M2 and M3, the target transistor found in step S520 this time is the transistor M6. In the following step S530, because the determination result is positive for the transistors M4 and M5, and the determination result is negative for the transistors M4 and M6, the transistors M4 and M5 are determined to be in the same transistor group (step S540), the transistors M4 and M6 are determined to be in different transistor groups (step S550), and the transistor M6 is determined to be in the same transistor group as the transistors M2 and M3 (as shown in the middle drawing of FIG. 6). Continuing with the flow in FIG. 5, finally, the transistors M1, M4, M5 and M7 are in the same group (i.e., the transistors M1, M4, M5 and M7 form a circuit sub block), and the transistors M2, M3, M6 and M8 are in same group (i.e., the transistors M2, M3, M6 and M8 form a circuit sub block). The two groups are electrically connected, but are separated at the gate of the transistor M6. Because the transistors M7 and M8 are electrically connected to ground, the determination result of step S560 is positive when the transistor M7 or M8 is treated as the target transistor; as a result, the flow of the division operation goes back to step S510, using another transistor that has not yet been grouped and is electrically connected to the voltage source as the reference transistor.

Figure 7:
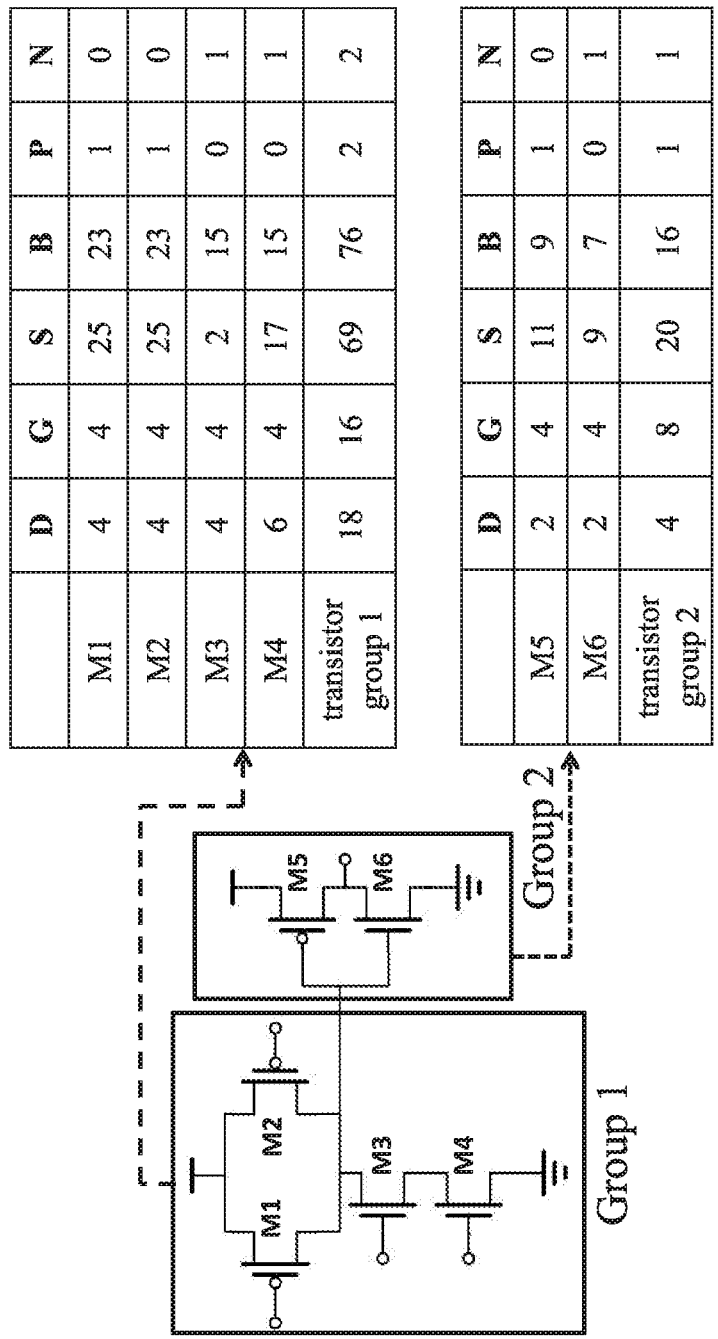
FIG. 7 illustrates another example of a group signature of a transistor group and the transistor signatures of individual transistors obtained according to the encoding rule of Table 1.

FIG. 7 is another example of a group signature of a transistor group and the transistor signatures of individual transistors obtained according to the encoding rule of Table 1. As shown in the figure, Group 1 and Group 2 are separated by gates of the transistors M5 and M6. Group 1 is a NAND gate and Group 2 is an inverter.

Reference is made back to FIG. 1. After step S140 is completed, the method proceeds to compare the group signatures (step S150). The detail of step S150 is similar to step S120; that is, a circuit-level comparison, (i.e., comparing group signatures) is conducted, followed by a transistor-level comparison (i.e., comparing transistor signatures) (steps S410 to S440). If matches are found in both the circuit-level comparison and the transistor-level comparison, the transistor group is marked as checked (a counterpart of step S450), and then the comparison process ends (step S460).

Next, when there is still an unchecked (not compared) transistor group (i.e., the determination result of step S160 is negative), the flow goes back to step S150; when all the transistor groups are checked (compared) (i.e., the determination result of step S160 is positive), the process proceeds to compare the transistor signatures of all the sporadic transistors that are not grouped (steps S170 to S180). When all the transistors are checked, the process of recognizing the circuit structure ends (step S190).

After the recognition of the circuit structure is completed, one can know what kind of predetermined components whose behaviors are known make up the circuit. The recognition results facilitate the development of other design flows, such as the behavior model creation of the circuit. The circuit structure recognition algorithm of this invention uses the electrical connections of the drains or sources of the transistors as the boundaries to divide the circuit into groups, making this algorithm beneficial for quickly identifying the circuit sub blocks with specific behavioral models (i.e., the transistor groups) from the circuit; therefore, this invention can complete the recognition of the circuit structure faster than recursively searching a hierarchy tree in the conventional method. In addition, the encoding algorithm of this invention is simple, which not only shortens the time for recognizing the circuit structure but also makes the comparison operation performed at both the circuit level and the transistor level possible to improve the comparison accuracy. Furthermore, because the signature of this invention can be in the form of numerals, which makes it easier to compare the signatures, this invention can complete the recognition of the circuit structure more quickly than recursively searching a hierarchy tree in the prior art.

The algorithm of this invention can be implemented as a computer program product (such as software, firmware or a combination thereof) containing multiple program instructions. The computer program product can be stored in a computer readable recording medium (e.g., volatile and non-volatile memories, etc.). The method of the present invention can be carried out after the program instructions are loaded and executed by a computer containing a computing unit having a program execution capability (e.g., a central processing unit, a microprocessor, a microcontroller, etc.).

Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A circuit structure recognition method, applied to a component connection description file that corresponds to a circuit and records a plurality of connections of a plurality of transistors in the circuit, the method comprising:
   generating a transistor signature for each transistor, wherein the transistor signature is associated with the connections of each transistor;
   dividing the circuit into a plurality of transistor groups according to a plurality of electrical connections of the drains or sources of the transistors;
   generating a group signature for each transistor group according to the transistor signatures of the transistors in each transistor group;
   comparing the group signatures with a predetermined group signature; and
   when a target group signature of the group signatures is the same as the predetermined group signature, recognizing a target transistor group corresponding to the target group signature as a predetermined circuit sub block cell corresponding to the predetermined group signature;
   wherein the circuit is coupled to a voltage source and a reference voltage, and the step of generating the transistor signature for each transistor comprises:
       adding a first value to a terminal value of a terminal of a target transistor among the transistors when the terminal is electrically connected to one of the voltage source and the reference voltage; and
       adding a second value to the terminal value of the terminal of the target transistor when the terminal is electrically connected to a terminal other than the voltage source and the reference voltage;
   wherein the transistor signature of the target transistor is a set of a plurality of terminal values of the target transistor.

2. The method of claim 1, wherein one of the first value and the second value is an odd number and the other is an even number.

3. The method of claim 1, wherein the step of adding the first value to the terminal value of the terminal comprises:
   adding different first values to the terminal value of the terminal when the terminal of the target transistor is electrically connected to the voltage source or the reference voltage.

4. The method of claim 1, wherein the step of adding the second value to the terminal value of the terminal comprises:
   adding different second values to the terminal value of the terminal when the terminal of the target transistor is electrically connected to the gate, the source, the drain or the bulk of any transistor.

5. The method of claim 1, wherein the step of generating the transistor signature for each transistor further comprises:
assigning a type code to the target transistor according to the target transistor being an N-type metal-oxide semiconductor field-effect transistor or a P-type metal-oxide semiconductor field-effect transistor;
wherein the transistor signature of the target transistor is a set of the terminal values and the type code of the target transistor.

6. A circuit structure recognition method, applied to a component connection description file that corresponds to a circuit and records a plurality of connections of a plurality of transistors in the circuit, the method comprising:
generating a transistor signature for each transistor, wherein the transistor signature is associated with the connections of each transistor;
dividing the circuit into a plurality of transistor groups according to a plurality of electrical connections of the drains or sources of the transistors;
generating a group signature for each transistor group according to the transistor signatures of the transistors in each transistor group;
comparing the group signatures with a predetermined group signature; and
when a target group signature of the group signatures is the same as the predetermined group signature, recognizing a target transistor group corresponding to the target group signature as a predetermined circuit sub block cell corresponding to the predetermined group signature;
wherein the step of dividing the circuit into the transistor groups according to the electrical connections of the drains or sources of the transistors comprises:
finding a first transistor;
finding a second transistor electrically connected to the first transistor;
determining the first transistor and the second transistor to be in a same transistor group when the drain or the source of the second transistor is electrically connected to the drain or the source of the first transistor; and
determining the first transistor and the second transistor to be in different transistor groups when the gate of the second transistor is electrically connected to the drain or the source of the first transistor.

7. The method of claim 6, wherein the circuit is coupled to a voltage source and a reference voltage, and the step of generating the transistor signature for each transistor comprises:
adding a first value to a terminal value of a terminal of a target transistor among the transistors when the terminal is electrically connected to one of the voltage source and the reference voltage; and
adding a second value to the terminal value of the terminal of the target transistor when the terminal is electrically connected to a terminal other than the voltage source and the reference voltage;
wherein the transistor signature of the target transistor is a set of a plurality of terminal values of the target transistor.

8. The method of claim 7, wherein one of the first value and the second value is an odd number and the other is an even number.

9. The method of claim 7, wherein the step of adding the first value to the terminal value of the terminal comprises:
adding different first values to the terminal value of the terminal when the terminal of the target transistor is electrically connected to the voltage source or the reference voltage.

10. The method of claim 7, wherein the step of adding the second value to the terminal value of the terminal comprises:
adding different second values to the terminal value of the terminal when the terminal of the target transistor is electrically connected to the gate, the source, the drain or the bulk of any transistor.

11. The method of claim 7, wherein the step of generating the transistor signature for each transistor further comprises:
assigning a type code to the target transistor according to the target transistor being an N-type metal-oxide semiconductor field-effect transistor or a P-type metal-oxide semiconductor field-effect transistor;
wherein the transistor signature of the target transistor is a set of the terminal values and the type code of the target transistor.

* * * * *